July 30, 1935.　　　　O. F. CARLSON　　　　2,009,648
FLOAT
Original Filed July 11, 1932　　　2 Sheets-Sheet 1
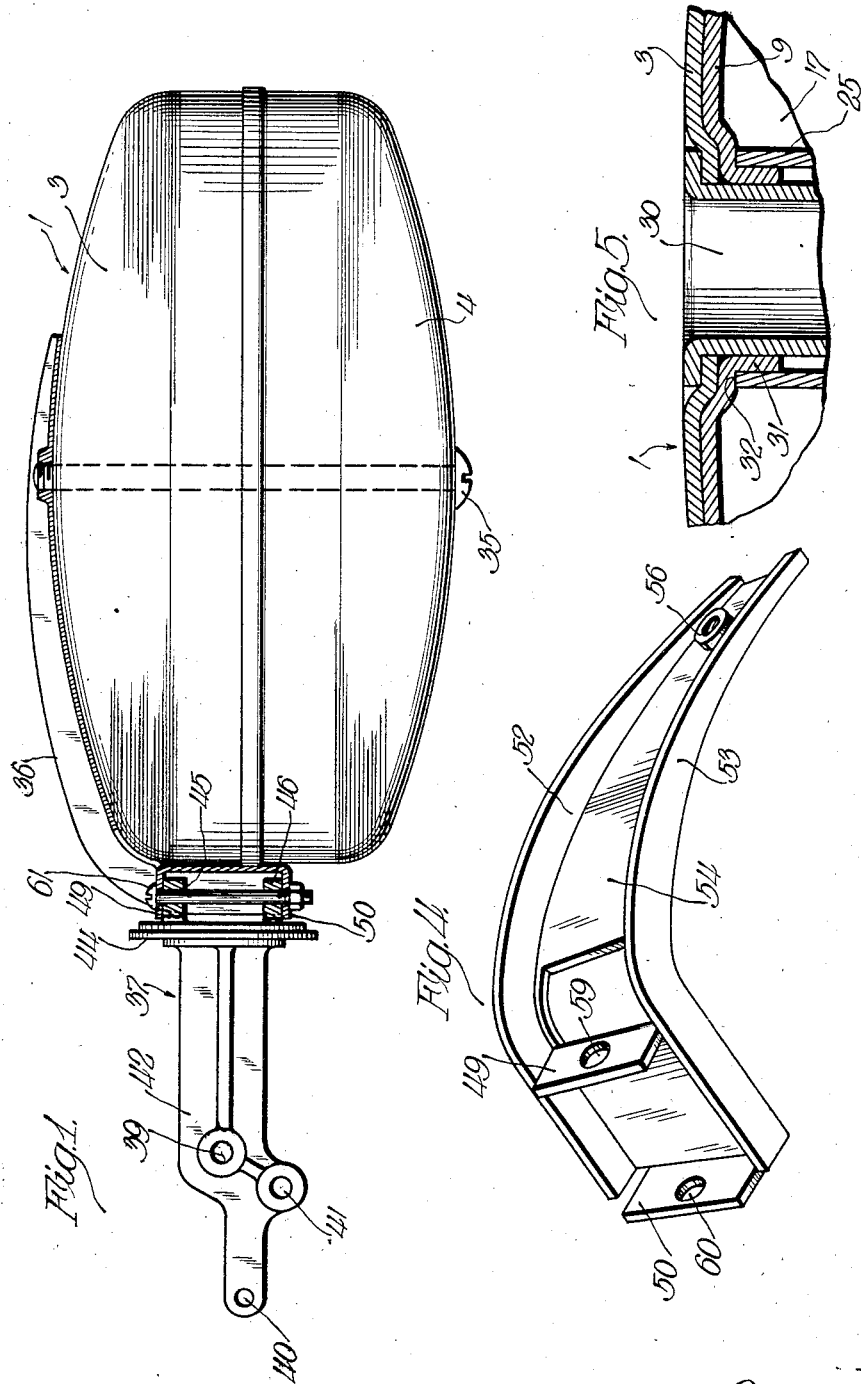
Inventor:
Oscar F. Carlson
By [signature]
Att'ys.

July 30, 1935.  O. F. CARLSON  2,009,648
FLOAT
Original Filed July 11, 1932   2 Sheets-Sheet 2
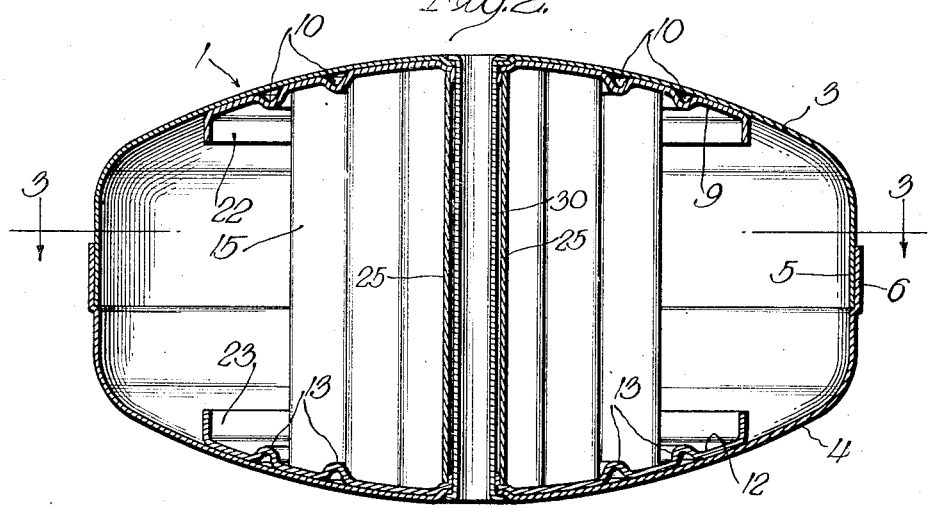
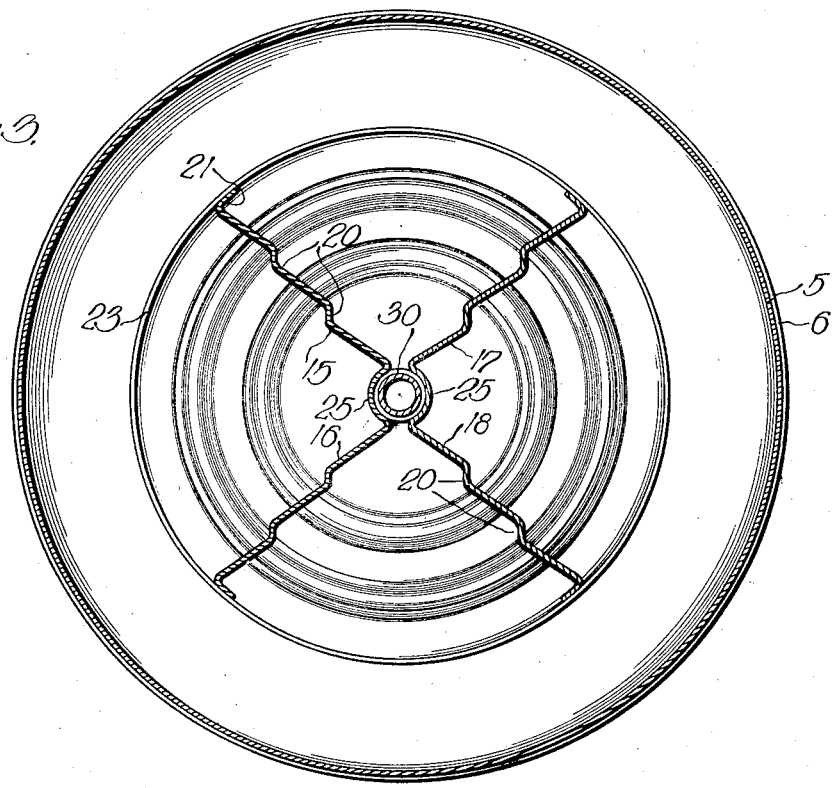
Inventor:
Oscar F. Carlson Patented July 30, 1935

2,009,648

UNITED STATES PATENT OFFICE 2,009,648

FLOAT

Oscar F. Carlson, Chicago, Ill., assignor of one-half to Oscar F. Carlson Company, Chicago, Ill., a corporation of Illinois, and one-half to Everett N. McDonnell, Chicago, Ill.

Original application July 11, 1932, Serial No. 621,859. Divided and this application February 23, 1933, Serial No. 658,099

15 Claims. (Cl. 137—104)

This application is a division of my copending application, Serial No. 621,859, filed July 11, 1932, patented April 16, 1935, No. 1,997,785, for improvements in a Boiler feed control.

The present invention relates generally to liquid level responsive devices and has for its principal object the provision of a new and improved form of float construction arranged to serve as a buoyant body and to be used to follow or respond to variations in liquid levels.

Another object of the present invention is improved float means, particularly although not necessarily adapted to be used in water feeders, feed regulators and the like and which is so constructed and arranged as to be highly responsive to changes in liquid level, and preferably this is accomplished by forming a float which has a relatively large diameter as compared with its height. By virtue of this construction slight changes in immersion of the float are sufficient to provide the proper control for the valves or other means controlled according to the changes in liquid level.

Another object of the present invention is to provide improved float means which, while light in weight and extremely responsive to small variations in liquid levels, is yet strong and sturdy and is capable of being employed under conditions where relatively substantial pressures are encountered.

Still further, another object of the present invention is the provision of a float construction embodying corrugated reinforcing members on the interior thereof to serve as means strengthening the float against collapse or distortion.

Still further, another object of the present invention is the correlation of such stiffening members with means providing for the convenient attachment of the float to the mechanism adapted to be associated therewith.

Another object of the present invention is the provision of a float capable of exerting considerable power but in which the vertical dimension and the vertical variation in depth of flotation is kept down to a minimum, whereby the float can be utilized in places where the available space is limited.

These and other objects of the present invention are attained in the preferred illustrative construction described in detail below and illustrated in the accompanying drawings, in which:

Figure 1 is a side elevation of a float constructed according to the principles of the present invention and showing the relation between the float and the associated float arm;

Figure 2 is a vertical section taken through the float shown in Figure 1 and showing in detail the reinforced construction of the float;

Figure 3 is a section taken along the line 3—3 of Figure 2;

Figure 4 is a perspective view of the inner section of the float arm shown in Figure 1; and Figure 5 is an enlarged fragmentary section illustrating how the walls of the float and the cooperating stiffening members are connected together.

Referring now to the drawings, the buoyant float is preferably constructed in the form of a hollow flattened shell 1 which comprises relatively shallow upper and lower halves or sections 3 and 4. These parts are preferably provided with narrow connecting portions terminating in cooperating marginal flanges 5 and 6 which are soldered or otherwise secured together in a manner to form a liquid-tight joint or seam. The upper and lower float parts 3 and 4 present substantially flat upper and lower walls having a considerable area and relatively narrow or shallow marginal walls or connecting portions. In order to reinforce the shell of the float and to strengthen the same against the pressures existing within the float housing, the present invention contemplates an assembly of reinforcing washers or plates and ribs or webs of novel construction. Associated with the upper float parts 3 is a washer or plate 9 forming a reinforcing stiffener and presenting a curvature corresponding to the relatively flat curvature of the upper wall of the float and provided with corrugations 10 to render the plates more rigid. The central portion of the member 9 is apertured and is depressed adjacent the edges thereof for a purpose which will appear later. The lower wall of the float is provided with a similar reinforcing washer or plate 12 provided with corrugations 13 and a central aperture. In the commercial form of the present invention these reinforcing or stiffening members or plates are identical in construction and formation.

To prevent the pressures within the float housing from collapsing the float, even with the presence of the reinforcing plates 9 and 12, the float is provided with vertical reinforcing ribs or webs arranged in interconnected pairs 15 and 16, and 17 and 18. These reinforcing ribs are also corrugated, as indicated at 20, the general plane of these reinforcing ribs being disposed radially with respect to the vertical geometrical axis of the float, and the radial outermost edges of the ribs are bent at right angles, as at 21, to provide the desired column strength for these parts. Each of the reinforcing plates 9 and 12 are provided with vertically disposed flanges 22 and 23 against which the angularly disposed edges 21 abut when these parts are assembled.

The ribs of each pair are interconnected together by a substantially arcuate section 25 which is concentric with respect to the geometrical axis of the float, as best shown in Figure 3. An intermediate member in the form of a pipe or tubular member 30 is mounted in the central apertures of the upper and lower walls of the float and of the reinforcing plates 9 and 12. This tubular member is disposed in between the concentric arcuate sections 25 and the upper and lower ends of the tubular member 30 are turned down against the edges of the upper and lower walls of the float and serve to press the same against the reinforcing plates 9 and 10 and to press the latter against the upper and lower edges of the reinforcing ribs. As will be clear from Figure 5, the edges of the central openings of the reinforcing plates are depressed or drawn into a short cylinder, as indicated at 31, and are disposed concentrically within the arcuate sections 25 of the vertically disposed reinforcing ribs. The arcuate portions of the reinforcing ribs are notched as at 32, to accommodate this construction. After the tubular member 30 has been inserted and fixed into position the ends thereof are securely sealed, as by soldering or the like, to the upper and lower walls of the float substantially flush thereof, thereby forming an pneumatically sealed buoyant body. The tubular member provides a convenient and simple construction for receiving a long bolt 35 by which with a single member the float I may be secured to its float arm.

Because of the relatively large diameter of the float I relatively small changes in the depth of flotation occasion a considerable difference in the displacement, and hence the float remains substantially at the same depth of immersion.

As more clearly shown in my copending application identified above, of which this application is a division, my improved float construction may be employed in boiler feed water controllers or regulators, such as those adapted for automatically supplying make-up water or other liquids to boilers or the like and to maintain a substantially constant liquid level in the boiler. Obviously, of course, the float of the present invention is not to be limited to any particular use. Therefore, while I have shown the float I as associated with the float arm appearing in my copending application mentioned above, it is to be understood that the float arm and associated structure illustrated in the accompanying drawings represent any desired operating mechanism adapted to be controlled by or to employ a buoyant float of the type described in detail above.

Referring now more particularly to Figure 1, it will be noted that the float I is carried by the inner section 36 of a float arm which is indicated in its entirety by the reference numeral 37. The float arm 37 represents any movable part of liquid level responsive mechanism. For example, the float arm 37 may be movably supported by a pivot pin or the equivalent received within the opening 39 in the float arm 37. Various mechanisms may be associated where desirable or necessary with the other openings 40 and 41 provided on the float arm. The latter may also carry a plate member 44 to which liquid-tight sealing means may be connected.

The outer section 42 of the float arm 37 is preferably in the form of a suitable casting or the like and is provided with horizontal and vertical webs for the purpose of strengthening the same. The inner end of the outer float arm section 36 is provided with a pair of ears 45 and 46 to receive the cooperating ears 49 and 50 formed on the inner float section 36, as best shown in Figure 4. Preferably, the inner float arm section 36 is formed of sheet metal with suitable marginal flanges 52 and 53 and a connecting web portion 54. At its innermost end the section 36 is formed with a boss 56 drawn in the web and provided with interior threads to receive the threaded end of the long screw or bolt 35 which secures the float I to the inner section 36 of the float arm 47, as mentioned above. The ears 49 and 50 are preferably formed, as indicated in Figure 4, by severing portions from the stock of which the section 36 is formed and bending the portions until they extend at substantially right angles to the plane of the web 64. The ears 49 and 50 are provided with apertures 59 and 60 to receive a bolt 61 by which the inner float arm section 36 is connected with ears 45 and 46 on the float arm casting 42. Preferably, and as shown in Figure 1, the inner float arm section 36 is curved to follow the contour of the float I. From the construction just described it will be observed that where the float arm or other float supporting or float connected means is shaped to conform to the curvature or other shape of the float and where the walls of the latter are flush, the means for securing the float in place is materially simplified. For example, as described above, the present construction is such that only a single securing member, namely, bolt 35, is necessary.

Mention was made above that the float of the present invention was one wherein its diameter was somewhat greater than its thickness, the float being of flattened spheroidal formation, by virtue of which the required vertical spacing necessitated by the provision of the liquid level responsive float mechanism, was not great. Further, where the float is of flattened form having a relatively large diameter, the float remains at substantially the same depth of emersion since small changes therein furnishes considerable power for the control of the mechanism associated therewith. This has a number of advantages. In the first place, where liquid level control means is to be operatively disposed so as to be movable between close limits the advantages of a float which is arranged for constant immersion are especially desirable. By constant immersion is meant a float in which sufficient operating power is derived from relatively small changes in the depth of flotation of the buoyant body. In the second place, where a float is to be operative between small limits and yet has sufficient buoyancy to provide ample power for the operating functions, a float having a relatively large diameter and a relatively small height is quite advantageous. Also, a float having these relative dimensions readily lends itself to a construction in which the depth of flotation throughout the operative range of the device does not change any material extent.

While I have shown and described above the preferred construction in which the present invention is embodied, it will be apparent to those skilled in the art that my invention is not to be limited to the specific details shown and described, but that, in fact, widely different means may be employed in the practice of the broader aspects of my invention.

What I claim, therefore, and desire to secure by Letters Patent is:

1. In a liquid level responsive mechanism, a float comprising a hollow shell of relatively small thickness compared to its diameter and having oppositely disposed substantially flat walls, centrally disposed reinforcing stiffeners connected to said opposite walls on the interior of said shell, and a pair of angle members connecting said stiffeners to prevent the collapse of the float under pressure.

2. In a liquid level responsive mechanism, a float comprising a hollow shell having upper and lower walls and connecting portions, said shell being shaped to have a small depth of flotation, reinforcing plates secured to the upper and lower walls to strengthen the latter, and stiffening ribs disposed in substantially radial relation in the interior of said shell between said reinforcing plates.

3. In a liquid level responsive mechanism, a float comprising a hollow shell having upper and lower walls of substantial area and relatively narrow connecting portions whereby said float has a small depth of flotation, reinforcing plates secured to the upper and lower walls to strengthen the latter, a centrally disposed tubular member positioned in openings formed in said upper end walls with ends extending exteriorly thereof, and stiffeners disposed in substantially radial relation in the interior of said shell and secured to said reinforcing plates, said stiffeners being arranged in pairs and each pair having a connecting portion concentric with respect to and disposed alongside said tubular member.

4. A float comprising a hollow shell having relatively thin walls, reinforcing stiffeners disposed against opposite walls of said shell and shaped to conform thereto, each of said stiffeners being provided with a reinforcing flange extending away from the associated float wall, and at least one compression member disposed at right angles to said reinforcing stiffeners and having its opposite ends formed to engage and accommodate the reinforcing flanges on said stiffeners.

5. A float comprising a hollow shell having relatively thin walls, reinforcing stiffeners disposed against certain of said walls, each of said stiffeners being shaped to conform to the associated wall and provided with a peripheral flange extending away from the associated wall and at least one corrugation, also extending away from said wall, said flange and said corrugation serving to increase the rigidity of said stiffener, and compression members having their ends formed to embrace and engage said corrugations and formed to accommodate the peripheral flanges on said reinforcing stiffeners.

6. A float comprising a hollow shell having relatively thin walls, reinforcing stiffeners disposed on the interior of said shell against opposite walls, each of said stiffeners being shaped to conform to the associated shell wall and provided with strengthening corrugations to increase the rigidity of the stiffener, and compression members connecting oppositely disposed stiffeners to increase the strength of the float against distortion.

7. A float comprising a hollow shell having relatively thin oppositely disposed walls, reinforcing plates secured to said oppositely disposed walls to strengthen the latter, and stiffening ribs disposed in substantially radial relation in the interior of said shell between said reinforcing plates.

8. A float comprising a hollow shell of flattened formation having relatively thin walls and of relatively small thickness compared to its diameter, corrugated reinforcing plates secured to oppositely disposed flattened walls, and corrugated columnar members secured to and extending between said reinforcing plate and strengthening the float shell against distortion under pressure.

9. A float comprising a hollow shell of flattened formation and having relatively thin walls, reinforcing plates secured to the flattened walls and disposed on the interior of the shell, said plates being provided with a series of strengthening corrugations, and longitudinally corrugated strengthening struts connecting said corrugated plates and having their end portions notched to receive the corrugations of said plates.

10. In a float adapted to be secured to a float arm, a hollow shell having relatively thin walls, reinforcing plates secured to and shaped to conform with said walls, and a plurality of compression struts extending between said reinforcing plates and connecting a plurality of spaced points of one plate with correspondingly spaced points on the other plate.

11. In a float adapted to be secured to a float arm, a hollow shell corrugated reinforcing plates secured to opposite walls of said shell, reinforcing rib members connecting the corrugated portions of said reinforcing plates, and a centrally disposed tubular member extending through said shell and having its ends connected, respectively, with said reinforcing plates and the associated shell walls, said tubular member serving to receive securing means for fastening the float to said float arm.

12. In a float adapted to be secured to a float arm, a hollow shell having oppositely disposed walls, reinforcing members disposed against said walls on the interior of said shell, radially disposed interconnected stiffening ribs disposed between said reinforcing members and extending from one to the other to strengthen the shell against collapse under exterior pressures, and a tubular member extending through the float and having its ends turned down against said reinforcing members and the associated walls to press the same against the interconnecting portions of said radially disposed ribs, said tubular member serving to receive means securing the float to said float arm.

13. In a float adapted to be secured to a float arm, a hollow shell having oppositely disposed walls, reinforcing members disposed against said walls on the interior of said shell, radially disposed interconnected stiffening ribs disposed between said reinforcing members and extending from one to the other to strengthen the shell against collapse under exterior pressures, and a tubular member extending through the float and having its ends turned down against said reinforcing members and the associated walls to press the same against the interconnecting portions of said radially disposed ribs, said tubular member serving to receive means securing the float to said float arm, said interconnecting portions being notched adjacent the tubular member so that when the ends of the latter are turned down against the shell walls and the reinforcing members, the ends of said tubular member lie substantially flush with the walls of the float.

14. A float comprising a hollow shell of flattened formation, reinforcing plates secured to the flattened walls of the shell to strengthen the walls thereof, a centrally disposed tubular member positioned in openings formed in said flattened walls and secured thereto, and stiffeners disposed between said reinforcing plates and secured thereto to prevent collapse of said shell, said stiffeners having portions disposed adjacent said central tubular member.

15. A float comprising a hollow shell having flattened opposite walls, reinforcing plates secured to said walls to strengthen the same, each of said plates being provided with a peripheral flange extending away from the associated shell wall, and angularly disposed stiffening ribs secured to and connecting said reinforcing plates to prevent collapse of the shell under pressure, said stiffening ribs having outwardly disposed flanges disposed adjacent the flanges on said reinforcing plates.

OSCAR F. CARLSON.